United States Patent Office 3,103,539
Patented Sept. 10, 1963

3,103,539
PESTICIDAL COMPOSITIONS
Eugene P. Ordas, Gary, Ind., assignor to Velsicol Chemical Corporation, Chicago, Ill., a corporation of Illinois
No Drawing. Filed Sept. 22, 1961, Ser. No. 139,841
8 Claims. (Cl. 260—644)

This invention relates to new chemical compositions of matter, more specifically, this invention relates to new chemical compounds of the formula:

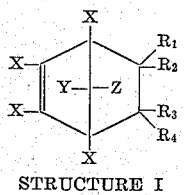

STRUCTURE I wherein X is selected from the group consisting of chlorine and bromine atoms; Y and Z are selected from the group consisting of hydrogen, chlorine, and bromine atoms and alkoxy radicals containing up to 3 carbon atoms; $R_1$ is selected from the group consisting of hydrogen and alkyl radicals containing up to 5 carbon atoms; $R_2$ is selected from the group consisting of nitro and nitroalkyl radicals containing up to 5 carbon atoms; $R_3$ is selected from the group consisting of hydrogen, phenyl, and alkyl radicals containing up to 5 carbon atoms; and $R_4$ is selected from the group consisting of hydrogen and a methyl radical.

These new chemical compounds, useful as pesticides, particularly as insecticides, can be readily prepared, for example, by the Diels-Alder addition of an appropriate halogenated cyclopentadiene with a suitable nitroalkene. The reaction can be carried out conveniently by heating the reactants for up to several hours and then distilling off any unreacted materials. While the reaction can be effected satisfactorily, with equimolar proportions of the reactants, an excess of the chlorinated diene can be used. A solvent is not essential, but inert solvents can be used, if desired. The residue remaining after the distillation of the starting materials is often satisfactory for pesticidal use as such, but the product can be purified, for example, by recrystallization from a suitable solvent.

Halogenated cyclopentadienes suitable for preparing the compounds of this invention are exemplified by hexachlorocyclopentadiene, 1,2,3,4,5 - pentachlorocyclopentadiene, 1,2,3,4 - tetrachlorocyclopentadiene, hexabromocyclopentadiene, pentabromochlorocyclopentadiene, 1,2,3,4 - tetrabromocyclopentadiene, 1,2,3,4 - tetrachloro - 5,5 - dimethoxycyclopentadiene, 1,2,3,4 - tetrachloro - 5,5-diethoxycyclopentadiene, and 1,2,3,4 - tetrachloro - 5,5-diisopropoxycyclopentadiene. Penta- and tetrachlorocyclopentadiene can be obtained, for example, by the catalytic hydrogenation of hexachlorocyclopentadiene in the presence of a platinum or palladium catalyst as described by McBee and Smith, J. Am. Chem. Soc. 77, 389 (1955). The tetrachlorodialkoxycyclopentadienes, can be prepared, for example, by heating the appropriate alkanol with hexachlorocyclopentadiene in the presence of a condensation agent.

When hexachlorocyclopentadiene is used as the starting material, all of X, Y and Z are chlorine atoms in the final product represented by Structure I; when 1,2,3,4,5-pentachlorocyclopentadiene is used, X and one of Y or Z are chlorine atoms and the other is a hydrogen atom, while when 1,2,3,4-tetrachlorocyclopentadiene is used, X is chlorine and Y and Z are both hydrogen atoms; when 1,2,3,4 - tetrachloro - 5,5 - dimethoxycyclopentadiene is used, X is chlorine and both Y and Z are methoxy radicals; when 1,2,3,4-tetrachloro-5,5-diethoxycyclopentadiene is used, X is chlorine and both Y and Z are ethoxy radicals; and when 1,2,3,4-tetrachloro-5,5-diisopropoxycyclopentadiene is used, X is chlorine and both Y and Z are isopropoxy radicals.

Examples of the suitable nitroalkenes for use in preparing the compounds of this invention are nitroethylene, 1-nitropropene-1, 2-nitropropene-1, 3-nitropropene-1, 1-nitro-2-methylpropene-1, 1-nitro-2-methylpropene-2, 2-nitrobutene-1, 2-nitrobutene-2, 1-nitrobutene-1, 2-nitropentene-1, 1-nitro-2,2-dimethylpentene-4, 1-nitro-4,4-dimethyl-pentene-1, 2-nitro-4-methylpentene-2, 2-nitrohexene-1, 2-nitroheptene-1, 1-nitro-2,4,4-trimethylpentene-1, 3-nitro-2,4,4-trimethylpentene-2, β-nitrostyrene, β-nitro-α-propenylbenzene, and the like. While other nitroalkenes may be used in the preparation of the compounds of this invention it is often preferred to use nitroalkenes of the formula

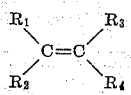

wherein $R_1$, $R_2$, $R_3$ and $R_4$ correspond to and are as described in Structure I, at least one of $R_1$, $R_3$, and $R_4$ being hydrogen.

The manner in which the new compounds of this invention can be prepared is illustrated in the following examples.

EXAMPLE 1

*Preparation of 2 - Nitro - 1,4,5,6,7,7 - Hexachlorobicyclo (2.2.1) Hept-5-ene*

Hexachlorocyclopentadiene (53 g.; 0.19 mole) was heated to and maintained at 140–150° C. Nitroethylene (14 g.; 0.19 mole) was added dropwise over a period of about one hour. The mixture was maintained at 140–150° C. for one and one-half hours after the addition was completed. The reaction mixture was allowed to cool to room temperature, was transferred with the aid of small amounts of hexane to a steam distillation apparatus, and steam distilled until evidence of a solid distillate was noted. The residue was extracted from the aqueous residual mixture by dissolving in hexane and separating the organic and aqueous layers. The organic layer was filtered through a bed of charcoal and the filtrate heated to remove the hexane. The residue was recrystallized twice from concentrated methanol solution to yield 2-nitro-1,4,5,6,7,7-hexachlorobicyclo (2.2.1) hept-5-ene, as a white waxy solid which melted at 177–8° C., and had the following elemental analysis as calculated for $C_7H_3Cl_6NO_2$

|  | C | H | Cl |
|---|---|---|---|
| Theoretical, percent | 24.31 | 0.87 | 61.51 |
| Found, percent | 24.20 | 0.87 | 61.48 |

EXAMPLE 2

*Preparation of 2-Nitro-3-Methyl-1,4,5,6,7-Pentachlorobicyclo (2.2.1) Hept-5-ene*

1-nitropropene-1 (17.4 g.; 0.2 mole) is added dropwise to 1,2,3,4,5-pentachlorocyclopentadiene (48 g.; 0.2 mole) at 130–150° C. over a period of about one and one-half hours. After the addition is complete, heating is continued for an additional one and one-half hours. This reaction mixture is cooled, unreacted material distilled, and the residue treated as described in Example 1 to yield 2 - nitro-3-methyl-1,4,5,6,7-pentachlorobicyclo (2.2.1) hept-5-ene.

EXAMPLE 3

*Preparation of 2-Nitro-2-n-Pentyl-1,4,5,6-Tetrachlorobicyclo (2.2.1) Hept-5-ene*

2-nitroheptene-1 (28.5 g.; 0.2 mole) is added dropwise to 1,2,3,4 - tetrachlorocyclopentadiene (41 g.; 0.2 mole) at 130–150° C. over a period of about two hours. After the addition is complete, heating is continued for an additional two hours. The reaction mixture is cooled and unreacted material removed by distillation. The product is recrystallized from methanol to yield 2-nitro-2-n-pentyl-1,4,5,6-tetrachlorobicyclo (2.2.1) hept-5-ene.

EXAMPLE 4

*Preparation of 2-Nitro-2-Methyl-3-Isopropyl 1,4,5,6-Tetrachloro-7,7 Dimethoxybicyclo (2.2.1) Hept-5-ene*

2-nitro-4-methylpentene-2 (36 g.; 0.2 mole) is added dropwise to 1,2,3,4-tetrachloro-5,5-dimethoxycyclopentadiene (53 g.; 0.2 mole) at 130–150° C. over a period of about two hours. After the addition is complete, heating is continued for an additional two hours. The reaction mixture is cooled and unreacted material removed by distillation. The product is recrystallized from methanol to yield 2-nitro-2-methyl-3-isopropyl-1,4,5,6-tetrachloro-7,7-dimethoxybicyclo (2.2.1) hept-5-ene.

EXAMPLE 5

*Preparation of 2-Nitro-3-Phenyl-1,4,5,6-Tetrachloro-7,7-Diethoxybicyclo (2.2.1) Hept-5-ene*

β-nitrostyrene (30 g.; 0.2 mole) is added dropwise to 1,2,3,4 - tetrachloro-5,5-diethoxycyclopentadiene (58 g.; 0.2 mole) at 130–150° C. over a period of about two hours. After the addition is complete, heating is continued for an additional two hours. The reaction mixture is cooled and unreacted material removed by distillation. The product is recrystallized from methanol to yield 2-nitro-3-phenyl-1,4,5,6-tetrachloro-7,7-diethoxybicyclo (2.2.1) hept-5-ene.

EXAMPLE 6

*Preparation of 2-Nitro-2,3-Dimethyl-1,4,5,6-Tetrachloro-7,7-Diisopropoxybicyclo (2.2.1) Hept-5-ene*

2-nitrobutene-2 (20 g.; 0.2 mole) is added dropwise to 1,2,3,4-tetrachloro-5,5-diisopropoxycyclopentadiene (64 g.; 0.2 mole) at 130–150° C. over a period of about two hours. Heating is continued for about two hours after the addition is complete. The reaction mixture is cooled and unreacted material removed by distillation. The residue is recrystallized from methanol to yield 2-nitro-2,3 - dimethyl-1,4,5,6-tetrachloro-7,7-diisopropoxybicyclo (2.2.1) hept-5-ene.

The method described in the previous examples can be utilized to prepare other useful compounds of this invention. Given in the following examples are the reactants required to prepare the indicated named compounds. It is understood that although specific reactants are named, other reactants within the scope of this invention may be substituted therefor to prepare the corresponding compounds.

EXAMPLE 7

3-nitropropene-1+hexachlorocyclopentadiene=2-nitromethyl-1,4,5,6,7,7-hexachlorobicyclo (2.2.1) hept-5-ene.

EXAMPLE 8

1-nitro-4,4-dimethylpentene - 1+1,2,3,4,5-pentachlorocyclopentadiene=2 - nitro - 3 - (β,β - dimethylpropyl)-1,4,5,6,7-pentachlorobicyclo (2.2.1) hept-5-ene.

EXAMPLE 9

β - nitro - α - propenylbenzene+1,2,3,4-tetrachlorocyclopentadiene=2 - nitro - 2 methyl-3-phenyl-1,4,5,6-tetrachlorobicyclo (2.2.1) hept-5-ene.

EXAMPLE 10

1-nitrobutene-1+1,2,3,4-tetrachloro - 5,5 - dimethoxycyclopentadiene=2 - nitro-3-ethyl-1,4,5,6-tetrachloro-7,7-dimethoxybicyclo (2.2.1) hept-5-ene.

EXAMPLE 11

1 - nitro - 2 - methylpropene-1+1,2,3,4-tetrachloro-5,5-diethoxycyclopentadiene=2-nitro - 3,3 - dimethyl-1,4,5,6-tetrachloro-7,7-diethoxybicyclo (2.2.1) hept-5-ene.

EXAMPLE 12

2 - nitropropene - 1+1,2,3,4 - tetrachloro-5,5-diisopropoxycyclopentadiene=2 - nitro - 2 - methyl-1,4,5,6-tetrachloro-7,7-diisopropoxybicyclo (2.2.1) hept-5-ene.

EXAMPLE 13

1-nitro-2,4,4-trimethylpentene-1+1,2,3,4,5-pentachlorocyclopentadiene=2 - nitro - 3 - methyl - 3 - (β,β - dimethylpropyl)-1,4,5,6,7-pentachlorobicyclo-(2.2.1) hept-5-ene.

EXAMPLE 14

1-nitro-2,2-dimethylpentene-4+1,2,3,4-tetrachlorocyclopentadiene=2 - (γ-nitro - β,β - dimethylpropyl) - 1,4,5,6-tetrachlorobicyclo (2.2.1) hept-5-ene.

EXAMPLE 15

1 - nitro - 2 - methylpropene - 2+hexachlorocyclo - pentadiene=2 - nitromethyl - 2 - methyl - 1,4,5,6,7,7, - hexachlorobicyclo (2.2.1) hept-5-ene.

EXAMPLE 16

1 - nitropropene - 1+hexachlorocyclopentadiene=2-nitro - 3 - methyl - 1,4,5,6,7,7 - hexachlorobicyclo (2.2.1) hept-5-ene.

EXAMPLE 17

2 - nitropropene - 1+hexachlorocyclopentadiene=2-nitro - 2 - methyl - 1,4,5,6,7,7 - hexachlorobicyclo (2.2.1) hept-5-ene.

EXAMPLE 18

2-nitrobutene-2+hexachlorocyclopentadiene=2 - nitro-2,3-dimethyl-1,4,5,6,7,7-hexachlorobicyclo (2.2.1) heptene.

EXAMPLE 19

β-Nitrostyrene+hexachlorocyclopentadiene=2-nitro-3-phenyl-1,4,5,6,7,7-hexachlorobicyclo (2.2.1) hept-5-ene.

EXAMPLE 20

1 - nitro - 2 - methylpropene-1+hexachloropentadiene=2-nitro-3,3-dimethyl-1,4,5,6,7,7-hexachlorobicyclo (2.2.1) hept-5-ene.

The utility of the compounds of this invention was illustrated, for example, by experiments carried out for the control of milkweed bugs. Filter papers were dipped in 5% solutions of the compounds to be tested in acetone, dried for four hours, and placed in the bottom of small plastic dishes. Each dish was greased with vaseline and provided with a small vial of water. Old milkweed seeds were sprinkled around the vial to prevent it from rolling. Ten third instar stage nymphs were placed in each test dish, which was then covered with an organdy lid. The bugs remained on the treated filter paper continuously and percent knockdown was recorded as the number of bugs lying on their backs kicking, but unable to stand upright. Several replicates and a control were used in each test. In these experiments, 2-nitro-1,4,5,6,7,7-hexachlorobicyclo (2.2.1) hept-5-ene gave the following results.

Test dish: Percent knockdown after 96 hours
Replicate No. 1 _____ 100
Replicate No. 2 _____ 80
Control _____ 0

Pesticidal compositions of this invention are prepared by mixing one or more of the new compounds of this invention with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogeneous free-flowing dusts by admixing the active compound or compounds of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like, so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. Other pesticides as well as such substances as fertilizers, activators, spreaders, and synergists can be added to these formulations if desired.

The active compounds of this invention are applied in amounts sufficient to exert the desired pesticidal action. The amount of the active compound present in the pesticidal compositions as actually applied for preventing or controlling pest infestations varies with the type of application, the particular species which are to be controlled, the purpose for which the treatment is made, and the like. Generally, the solid or liquid compositions of this invention will contain up to about 90% of the active compounds.

I claim:
1. A compound of the formula

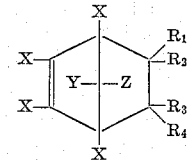

wherein X is selected from the group consisting of chlorine and bromine atoms; Y and Z are selected from the group consisting of hydrogen, chlorine and bromine atoms and alkoxy radicals containing up to three carbon atoms; $R_1$ is selected from the group consisting of hydrogen and alkyl radicals containing up to five carbon atoms; $R_2$ is selected from the group consisting of nitro and nitroalkyl radicals containing up to five carbon atoms; $R_3$ is selected from the group consisting of hydrogen, phenyl, and alkyl radicals containing up to five carbon atoms; and $R_4$ is selected from the group consisting of hydrogen and a methyl radical.

2. 2-nitro-1,4,5,6,7,7-hexachlorobicyclo (2.2.1) hept-5-ene.

3. 2 - nitro - 3 - methyl - 1,4,5,6,7,7 - hexachlorobicyclo (2.2.1) hept-5-ene.

4. 2 - nitromethyl - 1,4,5,6,7,7 - hexachlorobicyclo (2.2.1) hept-5-ene.

5. 2 - nitro - 2 - methyl - 1,4,5,6,7,7 - hexachlorobicyclo (2.2.1) hept-5-ene.

6. 2 - nitro - 2,3 - dimethyl - 1,4,5,6,7,7 - hexachlorobicyclo (2.2.1) hept-5-ene.

7. 2 - nitro - 3 - phenyl - 1,4,5,6,7,7 - hexachlorobicyclo (2.2.1) hept-5-ene.

8. 2 - nitro - 3,3 - dimethyl - 1,4,5,6,7,7 - hexachlorobicyclo (2.2.1) hept-5-ene.

References Cited in the file of this patent
UNITED STATES PATENTS

| | | |
|---|---|---|
| 2,671,043 | Gilbert | Mar. 2, 1954 |
| 2,917,551 | Bluestone | Dec. 15, 1959 |
| 2,936,262 | Gilbert | May 10, 1960 |
| 3,006,971 | Feuer et al. | Oct. 31, 1961 |